United States Patent [19]
Henderson

[11] 3,870,785
[45] Mar. 11, 1975

[54] PREOXIDATION AND PELLETING OF CARBON BLACK

[75] Inventor: Eulas W. Henderson, Toledo, Ohio

[73] Assignee: Phillips Petroleum Company, Bartlesville, Okla.

[22] Filed: Aug. 7, 1973

[21] Appl. No.: 386,306

[52] U.S. Cl. ............... 423/460, 23/314, 106/307, 264/117
[51] Int. Cl. ......................................... C01b 31/08
[58] Field of Search ....... 423/460; 23/314; 106/307; 264/117

[56] References Cited
UNITED STATES PATENTS

| | | | |
|---|---|---|---|
| 2,641,533 | 6/1953 | Cines et al. | 423/460 |
| 2,973,249 | 2/1961 | Haas | 423/460 |
| 3,050,378 | 8/1962 | Kron | 23/314 |
| 3,523,812 | 8/1970 | Kraus | 423/460 |
| 3,536,512 | 10/1970 | Deery | 106/307 |
| 3,565,657 | 2/1971 | Dannenberg et al. | 423/460 |
| 3,575,851 | 4/1971 | Visser et al. | 23/314 |

*Primary Examiner*—T. Tung

[57] ABSTRACT

Carbon black is pelleted in the presence of nitric acid and the wet pellets are dried. A gaseous stream, preferably flue gas from the drying step, is introduced into contact with the drying pellets to produce a purge gas containing nitrogen oxides. This purge gas is introduced into contact with the flocculent black to preoxidize the flocculent black prior to its introduction into the pelleter.

10 Claims, 1 Drawing Figure

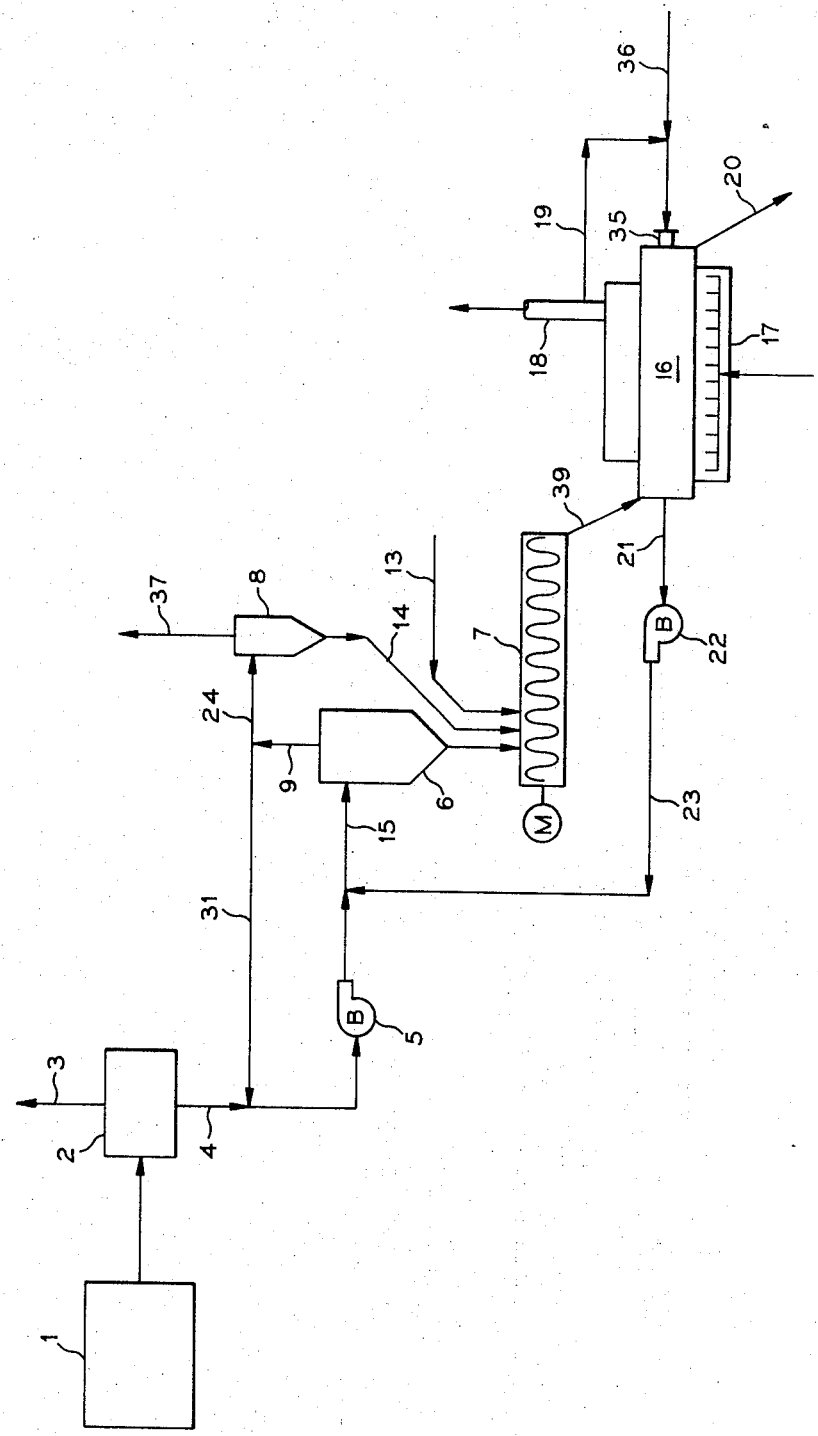

PREOXIDATION AND PELLETING OF CARBON BLACK

This invention relates to the oxidation of carbon black prior to pelleting.

In one of its more specific aspects, this invention relates to a process in which carbon black is preoxidized prior to pelleting and further oxidized during pelleting.

The production of pelleted carbon black is well known from such U.S. Pats. Nos. as 2,973,249 to Haas. In such processes, the carbon black is recovered from the smoke emitted from the carbon black furnace and pelleted in a wet-pellet mill. The wet pellets are dried in a dryer from which they are recovered. In the prior art, it is frequently the practice to contact the carbon black in the pellet mill with nitric acid.

In the method of the prior art, the use of nitric acid in the pelleting process is costly and the drying of the pellets can create problems concerning disposal of the oxides of nitrogen which are released. The method of the present invention contributes to the solution of these problems.

In the method of the present invention, the carbon black is pelleted in the presence of nitric acid. During the drying of the pellets, they are swept with a gaseous stream, preferably with flue gases produced in the dryer, to produce vapors, or a wet purge gas, containing nitrogen oxides. This wet purge gas is introduced into contact with the flocculent black prior to its introduction into the pelleter. In this manner, the flocculent black is pre-oxidized prior to its introduction into the pelleter and into contact with the pelleting solution.

Accordingly, the method of the present invention possesses at least three advantages over the method of the prior art; it provides an oxidation step in addition to that which is carried out in pelleting; it reduces the amount of nitric acid required for pelleting; and, it minimizes contamination of the atmosphere by those vapors evolved from the dryer.

The method of this invention is applicable to any oxidant which can be vaporized and which acts to alter the properties of the black as produced. For purposes of this disclosure, the invention will be explained in terms of the employment of nitric acid without intending to limit the invention thereto.

The method of the present invention is applicable to any oxidizable carbon black, to any pelleting procedure and to any drying procedure. While the invention will be explained in terms of forming the wet purge gas with the flue gas produced in heating the dryer, it is to be understood that other gases, such as air, can be introduced into contact with the pellets as they are dried to remove the oxides of nitrogen therefrom and to form the wet purge gas.

Preferably, the method of this invention is applicable to furnace black which can be wet-pelleted employing an aqueous pelleting solution comprising nitric acid, the pellets being dried in a rotary dryer from which at least a portion of nitrogen oxides which are evolved are introduced in a gaseous stream into contact with the flocculent black at any time prior to the introduction of the black into the pelleter.

The method of this invention will be more easily understood if explained in conjunction with the attached drawing which illustrates, schematically, one embodiment of the invention, although the invention is not to be considered as being limited thereto.

Referring now to the drawing, smoke produced in carbon black furnace 1 is introduced into a first filter 2 in which the carbon black is recovered in flocculent form, the filtered gas, substantially free of black, being disposed of through conduit 3.

The flocculent black is introduced through conduit 4 into conduit 31 to form a mixture with recycle conveying gases originating in surge tank 6 as described hereinafter. By means of blower 5, the mixture is conducted into conduit 15 and into contact with nitrogen oxides-containing wet purge gases entering conduit 15 through conduit 23. The mixture is conducted through conduit 15 into surge tank 6.

From surge tank 6, the flocculent black is introduced into pelleter 7. Also, there can be introduced into pelleter 7 through conduit 14 that carbon black recovered from purge gas separator-filter 8 into which some portion of the gases emanating from surge tank 6 can be introduced through conduits 9 and 24.

Also introduced into pelleter 7 through conduit 13 is a pelleting solution comprising nitric acid. This pelleting solution can comprise any solution known in the prior art and can contain a nitric acid concentration up to about 8 weight percent, with the solution generally being comprised of from about 90 to about 94 weight percent water.

Pelleting is conducted in the pelleter in the usual manner with the wet pellets and vapors from the pelleter being passed through conduit 39 into dryer 16.

Dryer 16 can be of conventional construction. Preferably, it is adapted with a fuel gas heating system 17 to provide the heat required for drying. It will also be provided with flue gas outlet 18 for venting the gases produced in the fuel gas heating system. Also, it will be provided with gas entry port 35 through which a gaseous stream, such as air through conduit 36, or hot flue gases through flue gas recycle conduit 19 can be introduced into direct contact with the pellets as they are being dried. In this manner, the drying pellets are swept of water vapor and oxides of nitrogen to produce the wet purge gas. The dried, oxidized pellets are recovered through conduit 20.

From dryer 16 through conduit 21, the wet purge gases are introduced by means of blower 22 and conduit 23 into contact with the black which can also be contacted with the recycle conveying gases. The wet purge gases will contain from about 1.5 to about 2.5 volume percent oxides of nitrogen computed as $HNO_3$, whereas the recycle conveying gases will usually contain from about 0.1 to about 0.4 volume percent oxides of nitrogen computed as $HNO_3$. In this manner, the flocculent black is pre-oxidized prior to its introduction into the pelleter.

As previously mentioned, carbon black which has been contacted with oxides of nitrogen is introduced into surge tank 6 which serves to provide adequate time for preoxidation of the black. From surge tank 6, some gaseous vapors comprising oxides of nitrogen are vented through conduit 9. Some portion or all of the vented gases can be introduced into contact with the flocculent black through conduit 31 as recycle conveying gases and some portion of the vented gases can be introduced into purge gas separator-filter 8.

In purge gas separator-filter 8, carbon black is separated from a gaseous stream which is disposed of through conduit 37. This stream will consist principally of moisture removed from the pellets and those gaseous materials employed to sweep the oxides of nitrogen from the dryer. A stream consisting principally of carbon black is returned to the system, preferably being introduced into the pelleter through conduit 14.

Contact between the flocculent black and vapors introduced into contact with it for pre-oxidation purposes is preferably made at a temperature within the range of from about 225° F. to about 275° F. at a pressure within the range of from about 0.6 to about 1.1 psig. While it is possible to eliminate surge tank 6 and to provide all contact between the flocculent black and the recycle vapors in the conduit through which the black is conveyed to the pelleter, it is preferable to provide surge tank 6 to permit adequate contact time between the unpelleted black and the vapors recycled into contact with it. In surge tank 6, a contact time of about 15 minutes to about 60 minutes between the carbon black and absorbed and/or occluded nitrogen oxides is sufficient. In conveying line 15, only about 1 second to 2 seconds of contact is effected.

Conducting the method of the invention as described will reduce the nitric acid requirement by about 86.5 percent. It will further reduce the quantity of nitrogen oxide vapors vented from the system to about 12.5 percent of that quantity emitted from the system in the absence of the practice of the invention, based upon a wet purge gas recycle rate of about 16 SCFH (SCFH means Standard Cubic Feet per Hour and refers here to the nitrogen oxides under standard conditions.) per pound of flocculent black and a recycle conveying gas recycle rate of about 8 SCFH per pound of flocculent black, the gases recycled having the oxides of nitrogen contents previously defined.

The following calculated embodiment illustrates the best mode of carrying out the method of this invention.

Carbon black in an amount of about 5,000 pounds per hour is conducted from a bag filter into contact with about 40,700 SCFH of recycle conveying gas containing about 0.27 volume percent nitrogen oxides computed as nitric acid.

This mixture is conducted into contact with about 79,000 SCFH of wet purge gases containing about 2 volume percent oxides of nitrogen computed as nitric acid. The mixture so formed is maintained at about 250° F and about 0.9 psig for a period of about 30 minutes. Thereafter, the pre-oxidized carbon black is introduced into pelleter.

Also introduced into the pelleter is 3,560 pounds per hour of aqueous pelleting solution having a nitric acid concentration of about 7 weight percent. The carbon black is pelleted with the pellets being introduced into a natural gas-heated dryer. Sufficient flue gas produced from the combustion of the natural gas is introduced into direct, sweeping contact with the pellets to provide the 79,000 SCFH of recycled wet purge gas. About 71,300 SCFH of gases is vented from the purge gas separation filter.

Whereas the prior art methods of pelleting would require about 275 pounds per hour of nitric acid, a comparable degree of oxidation employing the method of this invention requires only about 36.5 pounds per hour. Relatedly, while the prior art method would release about 1,500 SCFH of oxides of nitrogen for disposal, the method of the present invention is expected to reduce this quantity by about 87.5 percent.

It will be evident from the foregoing that various modifications can be made to the method of this invention. However, these are considered to be within the scope of the invention.

What is claimed is:

1. A method of pelleting carbon black which comprises:
   A. withdrawing flocculent carbon black from a filter and introducing said flocculent carbon black and nitric acid into a pelleter;
   B. pelleting said carbon black in contact with said nitric acid;
   C. drying the carbon black pellets thereby releasing oxides of nitrogen therefrom; and
   D. introducing said oxides of nitrogen into contact with said carbon black downstream of the filter and prior to the introduction of the flocculent carbon black into the pelleter so as to preoxidize said carbon black prior to the pelleting thereof in step (A).

2. The method of claim 1 in which said carbon black pellets are contacted with a first gaseous stream during the drying of said carbon black pellets to produce a second gaseous stream comprising oxides of nitrogen and said second gaseous stream is introduced into contact with said flocculent carbon black between the filter and the pelleter.

3. The method of claim 2 in which said first gaseous stream is air or flue gas.

4. The method of claim 1 in which said oxides of nitrogen are maintained in contact with said flocculent black for a period within the range of from 15 minutes to about 60 minutes prior to the introduction of said flocculent black into said pelleter.

5. The method of claim 4 in which oxides of nitrogen are separated from said black during said period and the separated oxides of nitrogen are reintroduced into contact with said flocculent black.

6. The method of claim 5 in which the oxides of nitrogen which are separated from said black are introduced into contact with the flocculent black downstream of the filter but prior to the pelleting of the carbon black.

7. The method of claim 5 in which the oxides of nitrogen are passed through a separator and the carbon black which is separated is introduced into said pelleter.

8. The method of claim 5 in which a first portion of the oxides of nitrogen which are separated from said black is introduced into contact with said flocculent black downstream of the filter but prior to the pelleting of the carbon black, and a second portion of the oxides of nitrogen is separated from carbon black entrained therein which carbon black is introduced into said pelleter.

9. The method of claim 11 in which said oxides of nitrogen are introduced into said flocculent black to produce a mixture which is maintained at a temperature within the range of from about 225° F. to about 275° F.

10. The method of claim 1 in which the quantity of oxides of nitrogen introduced into contact with said flocculent black is about 16 SCFH per pound of black.

* * * * *